(12) United States Patent
Nehls et al.

(10) Patent No.: US 8,858,568 B2
(45) Date of Patent: Oct. 14, 2014

(54) SYSTEM FOR MARKING A NON-HUMAN BIOLOGICAL OBJECT AND FOR TAKING A SAMPLE OF THE BIOLOGICAL OBJECT

(75) Inventors: Reinhard Nehls, Bocholt (DE); Roy Caisley, Isselburg-Vehlingen (DE); Henrik Winkeler, Euskirchen (DE)

(73) Assignee: Reinhard Nels, Bocholt (DE)

( * ) Notice: Subject to any disclaimer, the term of this patent is extended or adjusted under 35 U.S.C. 154(b) by 1107 days.

(21) Appl. No.: 12/514,170

(22) PCT Filed: Nov. 7, 2007

(86) PCT No.: PCT/EP2007/009712
§ 371 (c)(1),
(2), (4) Date: Sep. 10, 2009

(87) PCT Pub. No.: WO2008/055690
PCT Pub. Date: May 15, 2008

(65) Prior Publication Data
US 2009/0326548 A1 Dec. 31, 2009

(30) Foreign Application Priority Data
Nov. 8, 2006 (EP) .................................... 06076986

(51) Int. Cl.
*A01K 11/00* (2006.01)

(52) U.S. Cl.
CPC .................................. *A01K 11/003* (2013.01)
USPC .............................. 606/117; 40/301; 600/567

(58) Field of Classification Search
USPC .................. 606/116, 117, 184; 600/562–567; 206/569, 570, 219, 222; 40/301, 302; 435/287.6, 40.5, 40.25, 284.1, 284.6; 422/213, 232
See application file for complete search history.

(56) References Cited

U.S. PATENT DOCUMENTS

| | | | | |
|---|---|---|---|---|
| 4,461,837 A | * | 7/1984 | Karle et al. | 435/287.4 |
| 6,509,187 B2 | * | 1/2003 | Brem | 435/288.2 |
| 6,513,650 B2 | * | 2/2003 | Mollstam et al. | 206/222 |
| 6,659,338 B1 | | 12/2003 | Dittmann et al. | |
| 2004/0093775 A1 | | 5/2004 | Brem | |
| 2005/0228310 A1 | * | 10/2005 | Pfistershammer | 600/567 |
| 2007/0246381 A1 | * | 10/2007 | Pond | 206/222 |

FOREIGN PATENT DOCUMENTS

| | | |
|---|---|---|
| DE | 298 23 316 U1 | 5/1999 |
| DE | 10 2005 017 985 A1 | 10/2006 |
| EP | 1 389 421 A1 | 2/2004 |
| WO | 99/12475 A1 | 3/1999 |
| WO | 99/61882 A1 | 12/1999 |
| WO | 02/39810 A2 | 5/2002 |
| WO | 02/052928 A2 | 7/2002 |
| WO | 03/037075 A1 | 5/2003 |
| WO | 2004/010773 A1 | 2/2004 |
| WO | 2005/079562 A1 | 9/2005 |
| WO | 2006/000869 A2 | 1/2006 |

* cited by examiner

*Primary Examiner* — Kathleen Holwerda
(74) *Attorney, Agent, or Firm* — John S. Sopko; Hoffmann & Baron, LLP

(57) ABSTRACT

A system for marking a non-human biological object and removing a sample of the biological object, which object is in particular an animal, comprising: a first tag part (1), a second tag part (2), a pin (3), a sample container (10) and, a sample removing stopper (20) the system further including a functional compound arranged within a compartment of the system such that said functional compound is in communication with said sample when said sample has been introduced into the sample container.

19 Claims, 11 Drawing Sheets

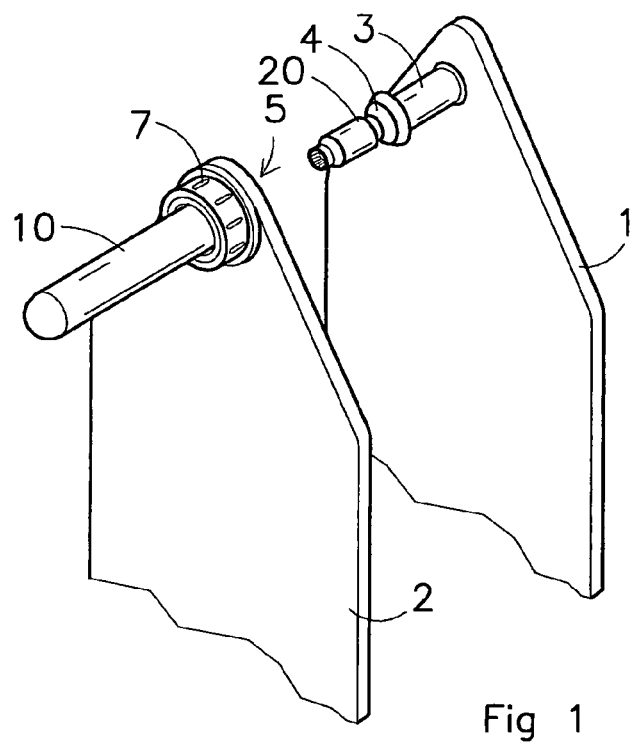
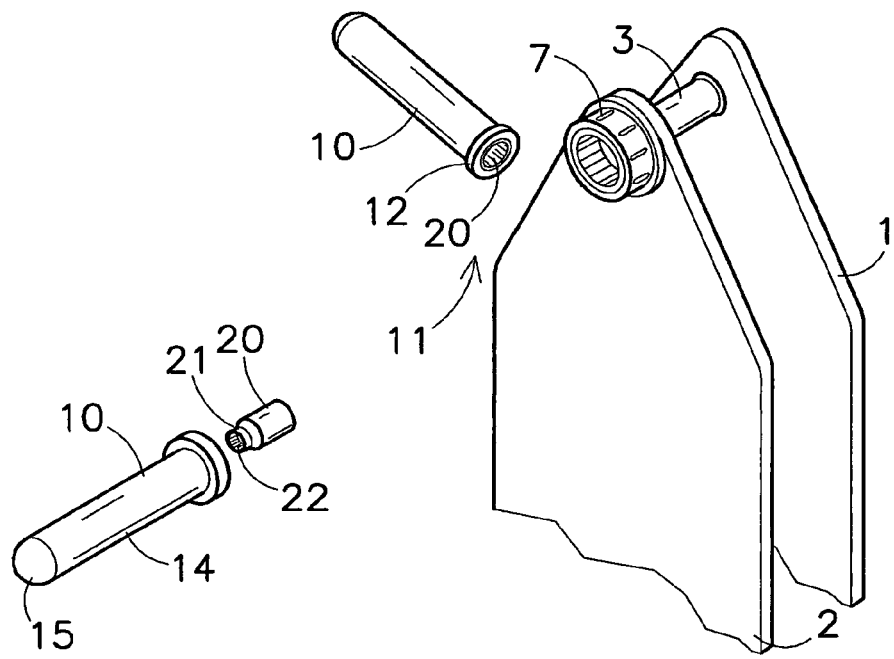
Fig 1
Fig 3
Fig 2

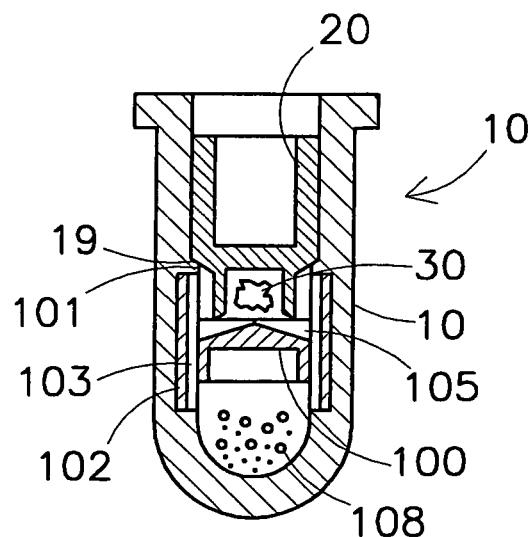
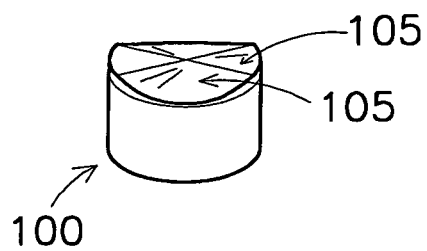
Fig 10a      Fig 10b
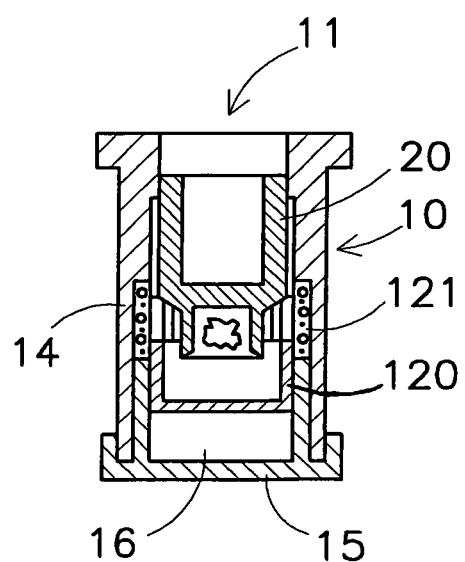
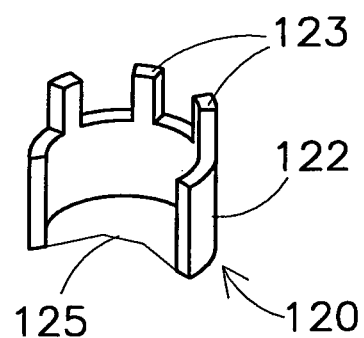
Fig 11a      Fig 11b

SYSTEM FOR MARKING A NON-HUMAN BIOLOGICAL OBJECT AND FOR TAKING A SAMPLE OF THE BIOLOGICAL OBJECT

CROSS-REFERENCE TO RELATED APPLICATIONS

This application is the National Stage of International Application No. PCT/EP2007/009712, filed Nov. 7, 2007, which claims the benefit of European Application No. 06076986.6, filed Nov. 8, 2006, the contents of which is incorporated by reference herein.

FIELD OF THE INVENTION

The invention relates to marking of a non-human biological object and at the same time removing a sample of the biological object.

In particular, the invention relates to marking and taking a sample of animals. However, the invention also relates to the marking and sampling of other non-human biological objects, such as plants.

The marking has at its main purpose to identify the object, as is in particular done for livestock.

BACKGROUND OF THE INVENTION

In the past few years, the desire and need to reliably identify individual animals has been increasing further. Particularly if the animals' meat is intended for human consumption or if the animals are going to be part of the human consumption chain in some other way, there is a need for reliable identification. One example is the BSE problem, where the accurate determination of the origin and the life history of the animals is of importance. However, the reliable identification of animals also is desired for animals that are not destined for consumption, but e.g. is a pet, (race) horse, or the like.

The invention relates to a system which not only provides for a tag, such as an eartag, to be attached to the animal, but also achieves the simultaneous removal and storage of a sample of biological material from the animal. The removal of a small sample of the biological material and storage thereof in the sample container can have various purposes, e.g. identification of individual animals based on the "genetic fingerprint" which can be determined using the sample taken. The removed sample can also be used for other purposes, such as that one or more test are performed on the sample, e.g. molecular genetic tests, blood test(s), etc.

Such systems are known, inter alia, from WO 99/12475, WO 99/61882, WO 02/39810, WO 02/052928, WO 03/037075, WO 2005/079562, and U.S. Pat. No. 6,509,187.

In WO 02/052928 it has been disclosed that the sample container is provided with easily penetrable lid (a film or membrane) covering the opening of the sample container. In the sample container a substance is present which serves to stabilise the DNA of the sample, e.g. protect the sample against DNA-degrading enzymes. For instance said substance is a hygroscopic substance serving to dry the sample. Upon attachment of the eartag parts, the stopper penetrates the lid and the sample comes into contact with said substance.

WO 02/052928 also suggests to provide the sample container with one or more membranes subdividing the container in compartments which can then each contain a specific substance. Upon introduction of the stopper the membranes should then be penetrated so that the substances come into contact with each other and the sample.

In US 2005/0228310 a granular preservative for the sample is retained by a sheet of porous material forming a compartment in the sample-receiving cavity of the stopper.

SUMMARY OF THE INVENTION

The present invention aims to propose alternative, preferably improved systems, in particular with regard to the manner of introduction and/or storage of one or more "functional compounds" within the sample container, which one or more "functional compounds" come into contact with the sample as said sample is introduced and stored in said sample container. Such "functional compounds" can be for example one or more preservatives, dehydrating agents and/or reacting agents.

The invention provides a system for marking a non-human biological object and removing a sample of the biological object, which object is in particular an animal, comprising: a first tag part (1), a second tag part (2) a pin (3), having a first end and a second end, which pin is connected to the first tag part by its first end and which pin is provided with a head (4) at its second end, in which the second tag part is provided with a receiving opening (5) for the head (4) of the pin, such that the pin can be pressed through a part of the biological object, in particular through the ear of an animal, and subsequently through the receiving opening of the second tag part (2), as a result of which the first and second tag parts are attached to one another and to the biological object via the pin, which system furthermore comprises: a sample container (10) with an introduction opening (11) for introducing a sample of biological material of the object into the sample container, which sample container (10) is attached to the second tag part (2) via a releasable connection, in such a manner that the opening (11) of the sample container and the receiving opening (5) of the second tag part lie in line, a sample removing stopper (20) which, while attaching the tag parts on biological object and removing the sample therefrom, is positioned on the head (4) of the pin (3) and is pressed through the biological object thereby removing the sample (30), followed by introduction of the sample and the stopper into the sample container, said stopper thereby sealing the introduction opening of the sample container, the system further including a functional compound arranged within a compartment of the system such that said functional compound can be in communication with said sample when said sample has been introduced into the sample container, which is characterized in that the system includes an openable capsule forming at least one sealed compartment filled with a functional compound therein, said capsule being pre-arranged within said sample container or aligned with the introduction opening of the sample container before attachment of the tag parts to the biological object, said capsule being adapted to open upon introduction of the stopper into the sample container, thereby bringing said functional compound in communication with the sample brought into the sample container by said stopper.

Preferably said capsule is a frangible capsule having a frangible wall which is fractured or the like upon introduction of the stopper into the sample container.

The invention allows to manufacture pre-filled capsules with functional compound therein, and arrange a capsule (or multiple capsules) at a suitable location so that upon entry of the stopper with the sample into the sample container said capsule is opened and the sample is exposed to or at least in communication with said functional compound.

It will be appreciated that the functional compound can have any suitable composition both in chemical and in physical form, e.g. as a granular or powdery material, as a liquid, a gel, a solid (e.g. a tablet), a gas, an emulsion, etc. It is possible that the functional compound is arranged in a compound container, which preferably has a porous or permeable wall or a porous or permeable wall part, which compound container is preferably arranged in the capsule.

The provision of a capsule, which is manufactured and filled as an item distinct from the sample container, is beneficial for the manufacturing process of the system, e.g. as no functional compound has to be filled directly into the sample container.

Also the properties of the material of the wall of the capsule as well as the design of said capsule can be selected independent from the sample container, so that each item can be optimised for its function and practical use.

In this respect it is noted that with a frangible capsule the wall material of the capsule (or part of said wall) can be selected to be frangible, whereas the sample container should commonly be strong and tough to resist damage during handling. Also such sample containers with samples held therein might be stored for a long time at low, freezing temperature. Plastic material, which is the preferred material for the body of the sample container, which is suited for such conditions preferably has a high impact resistance and thus is less suited to serve in a frangible structure.

The chemical composition of the one or more functional compounds can be selected based on the desired effect of the compound on the sample. For instance the compound can be a reagent, a preservative or a dehydrating agent, such as a molecular sieve, salt, silica gel, a compound for lysing the cells of the sample and/or a compound for eluting the sample tissue for obtaining RNA. As mentioned before many suggestions for functional compounds have already been presented in prior art as suitable for samples of biological objects and new developments, e.g. in the field of genetics, blood testing, etc, will likely produce new functional compounds all of which can be retained in a suitably designed openable capsule.

It is envisaged that the compound is a concentrated substance, which has a longer shelf life than a non-concentrate substance.

It is envisaged that a plurality of capsules is provided in the sample container. For example, one capsule could contain a functional substance in concentrated form and on other capsule could in that case contain a diluent. When both capsules are opened and both compounds are mixed, the desired concentration of the functional compound is obtained. The diluent could be water (if desired de-ionised and/or demineralised water), alcohol or some kind of acid or alkaline.

It is also possible that a capsule with a plurality of compartments is applied.

In a second aspect of the invention a system for marking a non-human biological object and removing a sample of the biological object, which object is in particular an animal, comprising: a first tag part (1), a second tag part (2), a pin (3), having a first end and a second end, which pin is connected to the first tag part by its first end and which pin is provided with a head (4) at its second end, in which the second tag part is provided with a receiving opening (5) for the head (4) of the pin, such that the pin can be pressed through a part of the biological object, in particular through the ear of an animal, and subsequently through the receiving opening of the second tag part (2), as a result of which the first and second tag parts are attached to one another and to the biological object via the pin, which system furthermore comprises: a sample container (10) with an opening (11) for introducing a sample of biological material of the object into the sample container, which sample container (10) is attached to the second tag part (2) via a releasable connection, in such a manner that the opening (11) of the sample container and the receiving opening (5) of the second tag part lie in line, a sample removing stopper (20) which, while attaching the tag parts on biological object and removing the sample therefrom, is positioned on the head (4) of the pin (3) and is pressed through the biological object thereby removing the sample (30), followed by introduction of the sample and the stopper into the sample container, said stopper thereby sealing the opening of the sample container, the system further including a functional compound arranged within a compartment of the system such that said functional compound can be in communication with said sample when said sample has been introduced into the sample container, wherein the sample container comprises a compartment filled with said functional compound, a valve member being arranged in the sample container between said compartment and the introduction opening, said valve member in a pre-arranged position thereof sealing said compartment, and said valve member being adapted to be moved into an opening position upon introduction of the stopper into the sample container, thereby establishing communication between said functional compound filled compartment and the sample introduced into the sample container.

In a preferred embodiment the valve member is a slideable valve member being arranged between said compartment and the introduction opening, said valve member in a pre-arranged position thereof sealing said compartment, and said valve member being adapted to be pressed deeper into the sample container upon introduction of the stopper into the sample container, thereby establishing communication between said functional compound filled compartment and the sample introduced into the sample container.

In a third aspect of the invention, a system for marking a non-human biological object and removing a sample of the biological object, which object is in particular an animal, comprising: a first tag part (1), a second tag part (2), a pin (3), having a first end and a second end, which pin is connected to the first tag part by its first end and which pin is provided with a head (4) at its second end, in which the second tag part is provided with a receiving opening (5) for the head (4) of the pin, such that the pin can be pressed through a part of the biological object, in particular through the ear of an animal, and subsequently through the receiving opening of the second tag part (2), as a result of which the first and second tag parts are attached to one another and to the biological object via the pin, which system furthermore comprises: a sample container (10) with an introduction opening (11) for introducing a sample of biological material of the object into the sample container, which sample container (10) is attached to the second tag part (2) via a releasable connection, in such a manner that the opening (11) of the sample container and the receiving opening (5) of the second tag part lie in line, a sample removing stopper (20) which, while attaching the tag parts on biological object and removing the sample therefrom, is positioned on the head (4) of the pin (3) and is pressed through the biological object thereby removing the sample (30), followed by introduction of the sample and the stopper into the sample container, said stopper thereby sealing the introduction opening of the sample container, wherein a solid body is present in the sample container for agitating the contents of the sample container during further processing of a sample contained in the sample container.

BRIEF DESCRIPTION OF THE DRAWINGS

Further advantageous embodiments of both aspects of the invention are described in the subclaims and in the following description with reference to the drawings.

In the drawings:

FIG. 1 shows an example of the system according to the present invention, including a first ear tag part provided with an integral pin and a releasable stopper, and a second ear tag part to which the sample container is releasably attached;

FIG. 2 shows the release of the closed sample container from the ear tag attached to the ear (not shown);

FIG. 3 shows a sample container and the associated stopper of the system according to FIGS. 1, 2;

FIG. 9a shows in section schematically a sixth example of a sample container, stopper and capsule of a system according to the invention;

FIG. 9b the capsule of FIG. 9a;

FIG. 10a shows in section schematically an example of a sample container, stopper and valve member of a system according to the invention;

FIG. 10b the valve member of FIG. 10a;

FIG. 11a shows in section schematically a second example of a sample container, stopper and valve member of a system according to the invention;

FIG. 11b the valve member of FIG. 11a;

DETAILED DESCRIPTION OF PREFERRED EMBODIMENTS

Figure 4A:
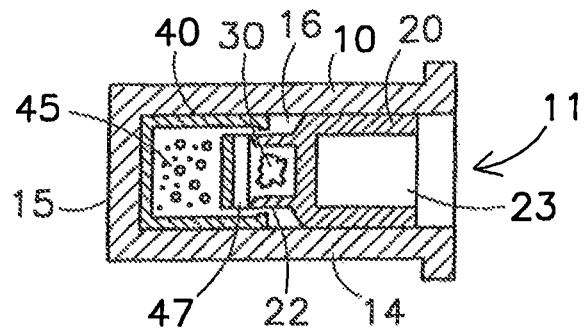
FIG. 4a shows in section schematically a first example of a sample container, stopper and capsule of a system according to the invention.

Below, an exemplary embodiment of all parts of the system for marking a biological object, in particular for ear-marking an animal, and for taking a sample of the biological object according to the invention will be described with reference to FIGS. 1-3.

As the invention is focused on the sample container the further drawings will not show the tag parts.

It is noted that those skilled in the art can take possible embodiments, details, variants, etc, as well as information regarding the method of application of the system, as well as potential use of the sample stored in the sample container from prior art documents in this field, e.g. as mentioned herein before.

The system illustrated comprises a first tag part 1, a second tag part 2 and a pin 3. The pin 3 has a first end and a second end, the pin 3 being connected to the first tag part 1 by its first end. The pin is provided with a head 4 at its second end. The pin 3 can be integrally moulded with the first tag part 1.

The second tag part 2 is provided with a receiving opening 5 for the head 4 of the pin 3, such that the pin 3 can be pressed through a part of the biological object, in particular through the ear of an animal, and subsequently through the receiving opening 5 of the second tag part 2, as a result of which the first and second tag parts 1, 2 are attached to one another and to the biological object via the pin 3.

It is noted that the tag parts can have a different design than shown here, and many embodiments are known in the art.

The system furthermore comprises a sample container 10 with an introduction opening 11 for introducing a sample of biological material of the object into the sample container 10, which sample container 10 is attached to the second tag part 2 (see FIG. 1) via a releasable connection, in such a manner that the opening 11 of the sample container 10 and the receiving opening 5 of the second tag part 2 lie in line.

In the embodiment shown, a flange edge 12 of the sample container 10 is releasably held in a raised annular wall 7 of the second tag part 2.

The system shown furthermore comprises a stopper 20 for sealing the opening 11 as the sample is introduced into the sample container 10.

While the pin 3 is being pushed through the object, the stopper 20 is on the head 4 of the pin 3, in such a manner that a sample of the biological object is taken while the pin is being pushed through the biological object and said sample is introduced into the sample container 10, following which the opening 11 of the sample container 10 is directly sealed by the stopper 20. At the same time, the stopper 20 may detach from the head 4 of the pin 3.

In the embodiment shown in all embodiments, the stopper 20 has a protruding circular cutter 21 at its front, preferably of metal, which here delimits a cavity 22 which is open at the front and in which the sample will mainly be received.

It is noted here that said stopper 20 could have a different embodiment. Examples thereof are shown in mentioned prior art documents and the skilled person will readily understand how to combine said stoppers with the measures according to the invention.

In a preferred embodiment, as illustrated in FIGS. 1-3, the sample container 10 comprises a body, for example produced by injection-moulding a suitable plastic, with a peripheral wall 14 and the opening 11 at one axial end and an integrally formed bottom 15 at the opposite axial end.

The body of the sample container 10 is preferably non-transparent, for example made from POM or polyamide.

The stopper 20 can be transparent in order that the introduction of a sample into the sample container 10 can be checked visually. The stopper 20 is preferably injection moulded from suitable plastic and can, for example, be made from PC (polycarbonate), PS (polystyrene), PMMA.

The metallic cutter ring 21 is preferably embedded in the stopper 20 upon injection moulding.

FIG. 4a shows container 10 with opening 11 and bottom 15 as well as peripheral wall 14, preferably delimiting a cylindrical main chamber 16 in said container 10.

Also shown is stopper 20, wherein the cross-section now also shows a recess 23 at the rear of the stopper 20 into which a part of the head 4 of the pin 3 can be seated in order to retain the stopper 20 on the pin 3 during pressing through the ear and into the sample container opening 11.

Figures 4B, 4C:
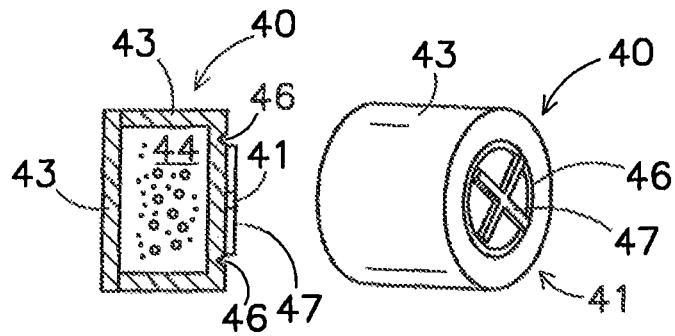
FIGS. 4b,c the capsule of FIG. 4a in perspective view and cross-section respectively, FIG. 5a,b shows in section schematically a second example of a second tag part, sample container, stopper and capsule of a system according to the invention.

The FIGS. 4a-c furthermore show an openable capsule 40 (here in FIG. 4a already opened as will be explained below) which capsule 40 has been pre-arranged or pre-fitted within the main chamber 16 of the container 10 before attachment of the tag parts to the ear, preferably already during manufacturing of the system.

The FIGS. 4b, c show the filled capsule 40 prior to its insertion into the main chamber 16.

The capsule 40 has a top wall 41 which should be directed towards the introduction opening 11 when the capsule 40 has been placed in the container 10. Opposite said top wall 41 the capsule 41 has a bottom wall 42 and a peripheral wall 43 there between.

The walls of the capsule 40 form a closed compartment 44 into which a functional compound 45 has been filled.

Here the top wall 41 is designed as a frangible wall, as preferred with one or more lines or weakness, here a circular or annular line of reduced wall thickness 46. As is preferred said line of weakness has a diameter equal or greater than the circular cutter 22.

As a preferred detail the top wall 41 also includes one or more ribs 47 on the side facing the stopper 20, here in the from of a cross, delimiting grooves there between.

As will be apparent to the skilled person the capsule 40 has been arranged here so as to fit clampingly, possibly with a snap fit, into the container 10. The capsule 40 could also be attached in different manners, e.g. with an adhesive.

The peripheral wall 43 preferably is of sufficient stability to remain intact when the capsule 40 is pressed into the main chamber 16, while the wall 43 frictionally engages the wall of the main chamber. A pressing tool could be made to act primarily on the stern face of said wall 43.

As FIG. 4a clearly shows, upon introduction of the stopper 20 with the sample 30 into container 10, the stopper 20 (here the cutter 22) will engage the frangible wall 41 and cause said wall 41 to fail, thus opening the compartment 44 and exposing the functional compound 45 to the sample 30.

Here the one or more ribs 47 and the grooves or channels there between prevent the cavity 22 to be closed off by the released part of the wall 41, so that exposure between the sample 30 and the compound 45 is possible at least via said channels. In practice said released part of the wall 41 is likely to detach fully from the stern of the stopper 20.

Suitable selection of the material of the walls of the capsule as well as shape and dimensions thereof will allow the designer of the system to obtain the desired behaviour of the capsule, e.g. with regard to barrier properties of the wall to protect the functional compound held in the capsule as long as the system is stored prior to use, behaviour upon fracturing the wall (e.g. force required to cause the fracture).

Figures 5A, 5B:
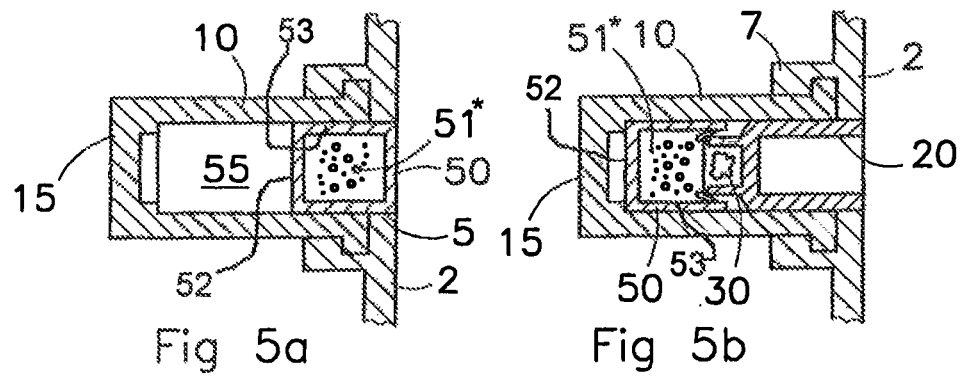

In FIGS. 5a,b an alternative sample container 10 as well as a part of tag part 2 with opening 5 have been shown.

In this embodiment an openable, here frangible, capsule 50 filled with a functional compound 51* is shown having a top wall 51, bottom wall 52 and peripheral wall 53. The capsule 50 is pre-arranged at the introduction opening 11 of the sample container 10 so as to close of said opening 11. In fact in this embodiment, the capsule 50 also extends into the opening 5 of the tag part 2, The peripheral wall 53 at least comprises a section that sealing fits into the sample container 10 to obtain the sealing of the main chamber thereof from the exterior. Also the capsule 50 now essentially "occupies" the opening 5 so that it e.g. is prevented that dirt or the like collects in said opening 5 and is introduced into the container 10 along with the sample.

In a suitable embodiment, e.g. with respect to the retaining of the capsule 50 at said forward location, the top wall 51 could also act as a sort of anvil when pressing the stopper 20 with cutter ring 22 through the ear.

The FIGS. 5a, b also shown that the sample container 10 has space 55 between an capsule abutment, here the bottom 15 of the container, and the openable capsule 50 pre-arranged at the introduction opening 11. The openable capsule 50 is adapted to be slidable within the container 10 towards said capsule abutment (bottom 15) upon introduction of the stopper 20 into the sample container so as to contact said capsule abutment (bottom 15), said capsule then opening upon further introduction of said stopper 20 into said sample container 10 (see FIG. 5a).

In an alternative not shown the capsule 50 could be retained by the second tag part 2, or between the second tag part 2 and the container 10, in a position outside of the container but aligned with the introduction opening, e.g. the capsule 50 could be a disc body retained in the opening 5 of the tag part 5 (or just behind said opening 5), or a blister-type package having two foil layers with a radial flange clamped between the container 10 and the second tag part 2. When the stopper 20 with the sample 30 held in its cavity then contacts the capsule 50, the capsule can be either fractured, so that the compound is released therefrom and moved into the container along with the stopper, or the capsule remains intact and is pushed into the container 10 and only the opened. It will be appreciated that this would allow to arrange the capsule on the second tag part at a suitable moment, e.g. during production of the system.

Figure 6:
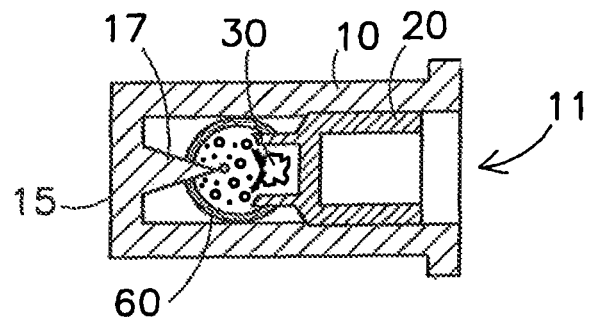
FIG. 6 shows in section schematically a third example of a sample container, stopper and capsule of a system according to the invention.

FIG. 6 shows a container 10 with stopper 20 and a frangible capsule 60 received in the main chamber 16 of the container 10. As mentioned the capsule could be clamped therein, but is also envisaged that a penetrable lid is closing off the introduction opening before the stopper 20 enters said opening 11.

As is shown here the capsule 60 is a spherical capsule, but other shapes (e.g. as known for medication) are also envisaged. Preferably said capsule 60 has a plastic or glass wall, which will fracture or the like upon suitable contact with the front end of the stopper (and/or sample pressed forward thereby).

In FIG. 6 it is shown that the sample container 10 includes one or more piercing members (here member 17 at the bottom 15) arranged to pierce the capsule 60 upon introduction of the stopper into the sample container. The piercing member 17 here is integrally moulded with the container 10.

Figures 7A, 7B:
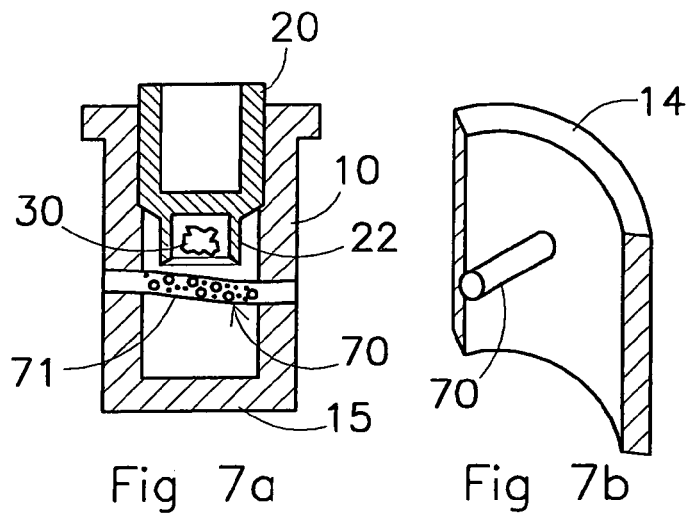
FIG. 7a shows in section schematically a fourth example of a sample container, stopper and capsule of a system according to the invention.
FIG. 7b a part of the system of FIG. 7a in more detail.

FIGS. 7a, b show a further alternative, wherein the sample container 10 has been injection moulded and a functional compound filled capsule 70 has been integrally moulded as insert in said sample container 10.

Here the capsule 70 is a tubular capsule, the compound 71 being filled in the tubular capsule, which capsule 70 extends across the sample container 10. The ends of the tubular capsule 70 are retained in the wall of the sample container 10 by the injection moulding.

As will be clear the cutter 22 will sever the tubular capsule 70 upon closing the sample container 10 and thereby expose the sample 30 to the compound 71 within the capsule 70. It will be understood that several tubular capsules can be arranged. The capsule 70 could be a hollow fibre or a bundle of hollow fibres filled with one or more compounds.

One or more of the axial ends of a tubular capsule 70 could be visible at the exterior of the container 10 and possibly serve as a septum for a connection, e.g. a syringe type connection to the container 10, e.g. to remove sample material and/or flush a fluid through said container (e.g. to remove sample material).

Figure 8:
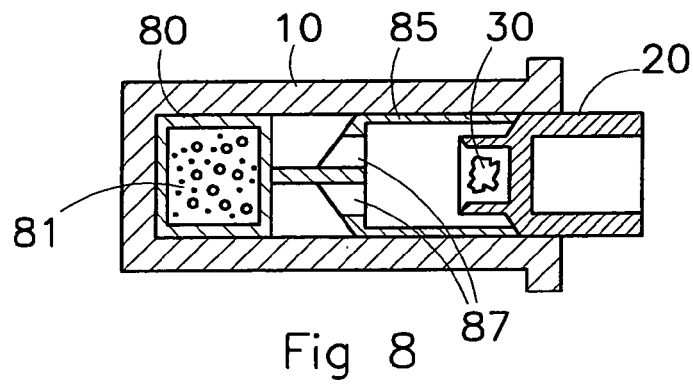
FIG. 8 shows in section schematically a fifth example of a sample container, stopper and capsule of a system according to the invention.

In FIG. 8 a container 10 is shown as well as stopper 20 and capsule 80, here positioned near the bottom of the container 10. Also is shown a slideable opening assisting member 85, which is arranged within the sample container 10, between the openable capsule 80 and the introduction opening, so that upon introduction of the stopper 20 into the sample container 10 said stopper 20 engages the slideable opening assisting member 85 and said member 85 interacts with said capsule 80 thereby opening the capsule 80.

In a preferred embodiment the member 85 serves to direct and most preferably concentrate the force exerted by the stopper 20 on the member 85 to a specific area or part of the capsule 80 so as to promote the fracturing or the like thereof. As is shown here the member 85 includes one or more passages 87 that allow for communication between the sample 30 and the functional compound 81 in the fractured capsule 80.

It will be understood that in FIG. 8 and many other embodiments the capsule could have multiple chambers therein, each being filled with a specific functional compound.

It will also be understood that multiple capsules could be arranged within a single container 10, e.g. stacked or positioned side by side, all capsules being opened upon introduction of the stopper 20 into the container 10.

Figures 9A, 9B:
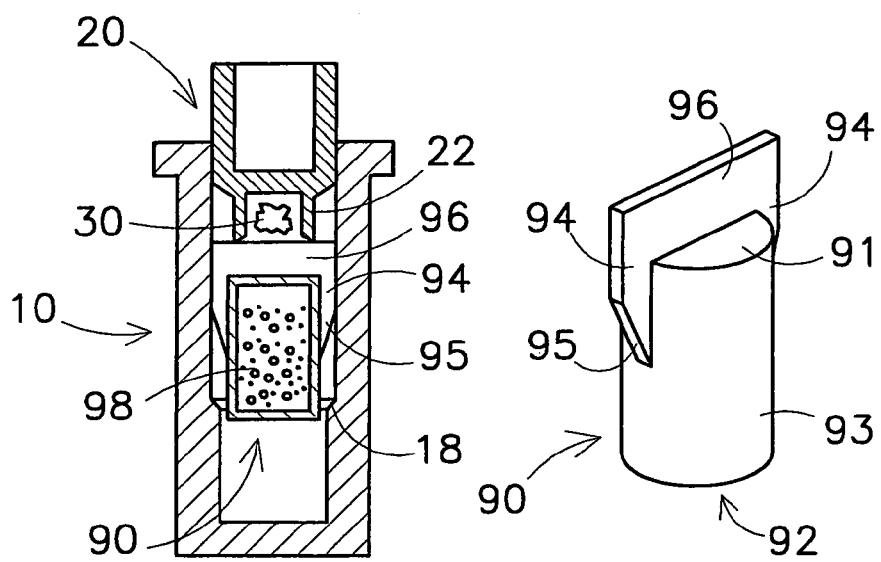

In FIGS. 9a, b an alternative sample container 10 is shown and also stopper 20. Pre-arranged within the main chamber 16 is a capsule 90, which contains a functional compound. The capsule 90 and sample container 10 are here adapted such that upon pressing said capsule 90 deeper into the sample container 10 (by means of the stopper being introduced into the container) a peripheral wall of said capsule 90 is fractured.

In detail this example shows that the capsule 90 comprises a top wall 91, bottom wall 92 and peripheral wall 93, here embodied as a cylindrical wall 93. The diameter of the cylindrical wall 93 is less than the diameter of the main chamber 16, so that space or passageway is present there between.

On the exterior of the peripheral wall 93 here two radially outward directed ribs 94 are present each having a wedge part 95. As can be seen in the FIG. 9a in the pre-arranged position of the capsule 90 the ribs 90 engage on a section of the wall of the main chamber 16 having an essential equal diameter as the span across the ribs 94.

Further away from the opening 11 the main chamber has a section of reduced diameter, here formed starting from a conical shoulder 18. As can be understood clearly from the FIG. 9a when the capsule 90 is pressed from its pre-arranged position deeper into the main chamber 16, the wedge parts 95 will contact the shoulder 18 and as a result the wedge parts 95 and ribs 94 will be forced inwardly. This will result in stresses in the peripheral wall 93 leading to the fracture or the like of said wall 93 and thus the opening of the capsule 90.

The ribs 93 also establish a passageway along the side of the capsule to the top end thereof towards the stopper and the sample 30 held thereby. In order to facilitate the exposure of the sample to the functional compound 98, the top wall 91 has one or more ribs 96 that provide one or more passages along which contact can be established between the space outside the cutter ring 22 and the sample receiving space within the cutter ring 22 by "going underneath" the cutter ring.

FIG. 10 shows an example of the container and stopper as well as valve member of a system according to the second aspect of the present invention.

In FIG. 10 a sample container 10 is shown along with stopper 20. The sample container has an introduction opening 11 for the stopper 20 providing entry to the main chamber 16 of the container 10. The opposite end of the main chamber 16 is closed by a bottom 15.

The stopper 20 is made to fit tight in the main chamber 16 so as so cooperate with the peripheral wall of the container 10 in a sealing manner. A closed position of the stopper 20 is in this example predetermined by a stopper abutment shoulder 19 of the main chamber 16.

The embodiment in FIGS. 10a,b does not have a capsule into which a functional compound has been pre-filled as in the previous examples. Instead a part of the main chamber 16 is now used as compartment filled with said functional compound 108.

The compartment is delimited by the bottom 15 and peripheral wall of the sample container 10, and also by a slideable valve member 100. This slideable valve member 100 is arranged slidingly within the main chamber 16.

In a pre-arranged position the valve member 100 sealing cooperates with the wall of the main chamber, in particular with an annular seat 101 for said valve member 100, here located further spaced from the opening 11 than the stopper abutment 19.

In said pre-arranged position the valve member 100 closes the compartment, which is preferably filled with functional compound 108 before placing the valve member 100.

In this example an annular insert 102 has been integrated into the injection-moulded body of the container 100, so as to define an axial section of the wall of the main chamber. The inner surface of said insert 102 here has a number of communication grooves 103, all located further away from the opening 11 than the seat 101.

When the stopper 20 with sample 30 is pressed into the container 10, the stopper 20 engages on the valve member 100 in its pre-arranged position and pushes the valve member 100 further inward, out of its seat 101. The valve member 100 then slides along a part of the insert 102, so that the grooves bypass the valve member 100 and thus interconnect the compartment with functional compound to the area where the sample is held.

In FIGS. 10 a,b it can be seen that the valve member 100 has one or more recesses 105 on the top wall thereof to facilitate the exposure of the sample 30 to the functional compound 108.

It will be appreciated that the insert could instead of grooves also have internal bypass channels or the like to achieve the effect of bypassing the valve member displaced further inward from its seat 101. Such channels or grooves could also have been formed in the body of the container within the use of an insert.

FIGS. 11a, b illustrate a sample container 10 having a peripheral wall 14, an opening 11 for the stopper 20, wherein the bottom 15 is not integrally moulded with the peripheral wall 14 but is made as a closure which is fitted later onto the peripheral wall, e.g. by welding, adhesive or the like.

The system of FIG. 11 includes a slidable valve member 120 arranged within the main chamber 16. In the peripheral wall 14 an annular compartment 121 has been formed in which said functional compound is arranged, here as an annular preformed body made of or comprising said functional compound (e.g. retained within a porous annular body).

The compartment has an opening towards the main chamber, here (as is preferred) said compartment 121 being an annular groove in said wall of the main chamber.

The valve member 120 in its pre-arranged position covers the opening of the compartment, here the entire groove 121. As is clear from the FIGS. 11a,b the valve member 120 is pressed deeper into the container 10, and in said process uncovers said opening of the compartment so as to establish communication between said compartment and the sample 30.

In this example the valve member 120 comprises a cylindrical wall having a sealing section 122 which is able to cover the groove 121 and a main wall 125 extending across the main chamber 16.

In this example said cylindrical wall is extended toward the opening 11 by fingers 123 having openings there between. The stopper 20 will engage said fingers 123 to push the valve member from its pre-arranged position as is shown in FIG. 11a.

Figure 12:
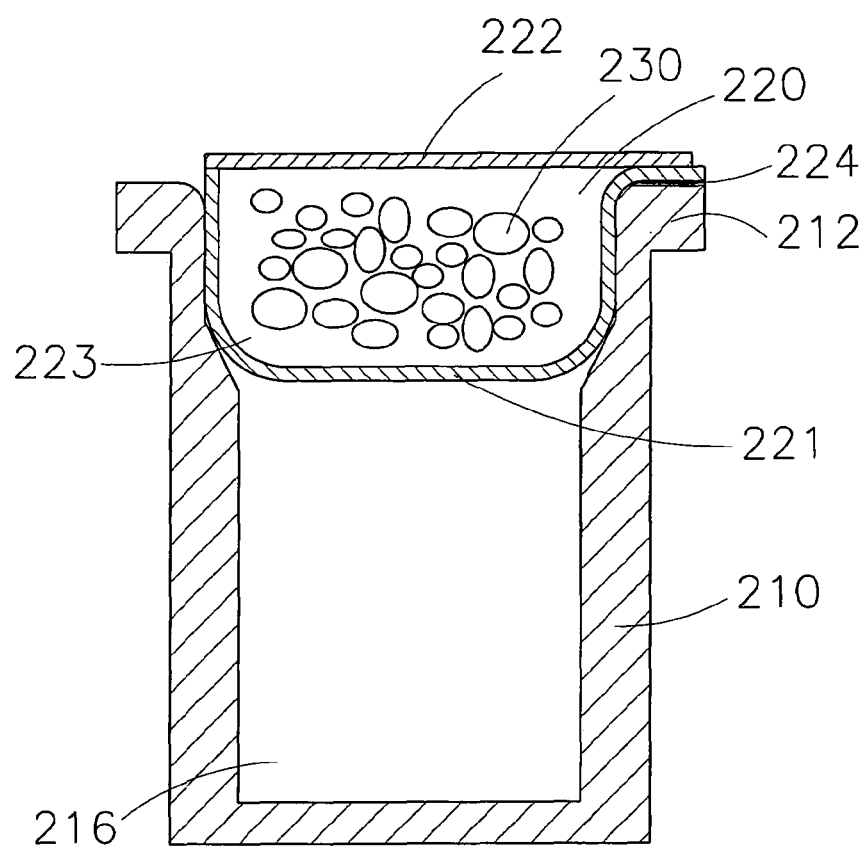
FIG. 12 a further alternative embodiment of a sample container according to the first aspect of the invention, in cross section.

FIG. 12 shows a further alternative embodiment of a sample container according to the first aspect of the invention, in cross section.

FIG. 12 shows a sample container 210 having a chamber 216 that is preferably cylindrical. The sample container 210 is provided with an upper flange 212.

In the sample container 210, an openable capsule 220 is arranged. This capsule 220 comprises a first capsule part 221 and a seal 222. Between the inner wall of the first capsule part 221 and the seal 222, a cavity 223 is present, in which a functional substance 230 is arranged.

In this example, the capsule is similar to a blister package, as is known for example from the packaging of drugs or the like.

Both the seal 222 and the first capsule part 221 are frangible. When a stopper 20 as described in conjunction with the other embodiments that are described is introduced into the sample container 210, both the seal 222 and the first capsule part 221 are distorted so that the functional compound is released into the chamber 216 of the sample container 210.

In the example of FIG. 12, the capsule 220 is connected to the flange 212 of the sample container 210 by one or more local connections 224. The connection 224 can be for example a weld or a glued connection.

Figure 13A:
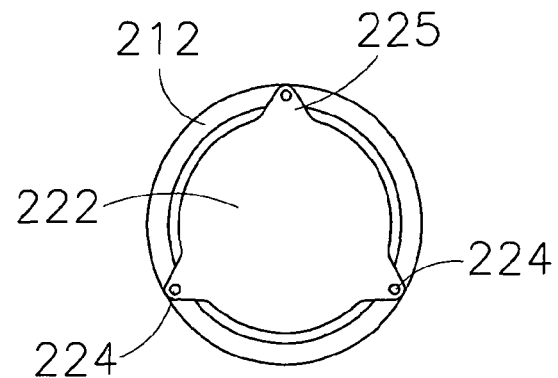
FIG. 13 the embodiment of FIG. 12 in top view and a manufacturing phase of a variant thereof.

FIG. 13A shows the embodiment of FIG. 12 in top view. In this example, the seal 222 is provided with three lobes 225, which are attached to the flange 212 of the sample container 210 by means of spot welds 224.

Figure 13B:
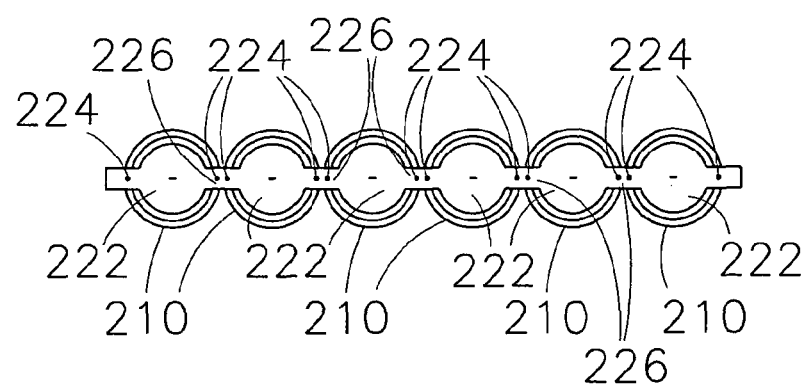

In manufacturing, it is possible to apply a strip of seals 222 to an array of sample containers 210, as is shown in FIG. 13B. In this example, the seals 22 are connected to each other by strip parts 226. Spot welds 224 connect the seals 222 to the sample containers 210, the spot welds being arranged at the strip parts 226.

After connecting the seals 222 by means of the spot welds 224 to the associated sample container 210 with opening 211, the strip parts 226 are cut through so that individual sample containers 210 are obtained.

FIG. 14 shows an example of a method for manufacturing the sample container of FIG. 12.

Figure 14A:
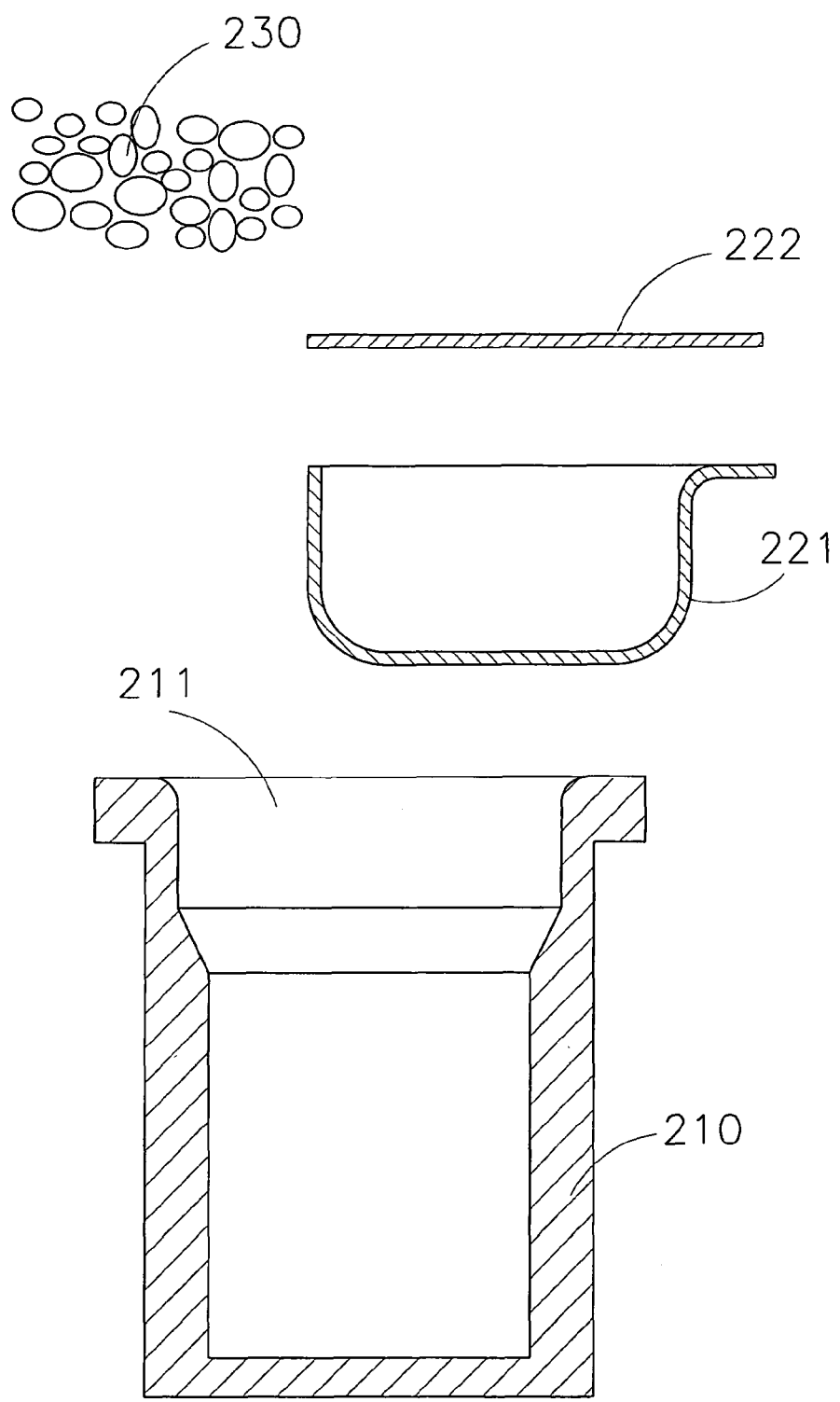
FIG. 14 an example of a method for manufacturing the sample container of FIG. 12.

FIG. 14A shows the starting materials: the sample container 210 (which preferably is manufactured by means of injection moulding), the first capsule part 221 (which can be formed e.g. by injection moulding, vacuum forming or blow forming), seal 222 and functional compound 230.

Figure 14B:
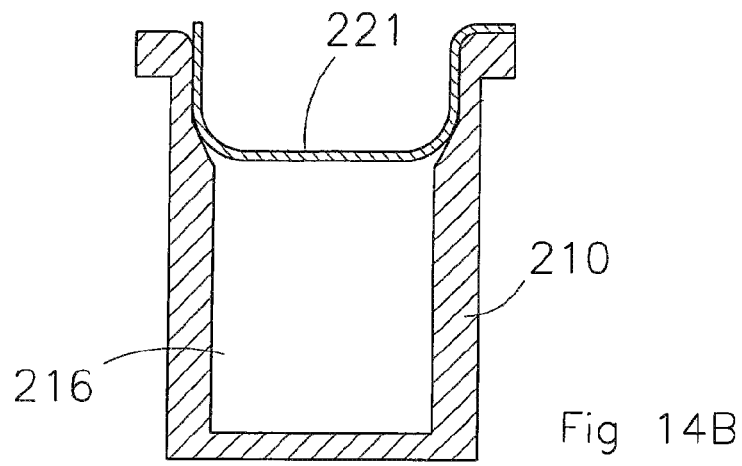

FIG. 14B shows the first step of the manufacturing method. In this step, the first capsule part 221 is arranged in the sample container 210. Locally, the first capsule part 221 is attached to the sample container 210, for example by spot welding or glueing. The first capsule part 221 is aligned with the opening 211 of the sample container 210.

Figure 14C:
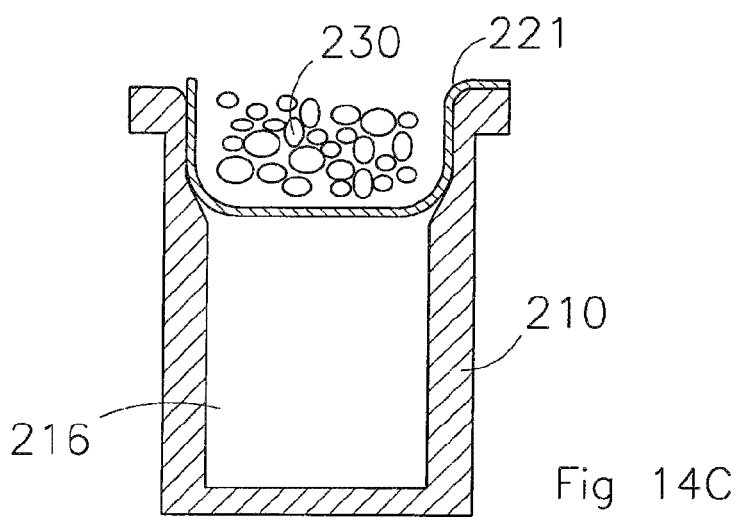

In the step shown in FIG. 14C, a predetermined amount of functional compound 230 is arranged in the first capsule part 221. In the example shown, the functional compound has the form of a powder, but it could also be in the form of a liquid or a solid. The solid can be porous or not. For instance the functional compound can be a reagent, a preservative or a dehydrating agent, such as a molecular sieve, salt, silica gel, a compound for lysing the cells of the sample and/or a compound for eluting the sample tissue for obtaining RNA.

Figure 14D:
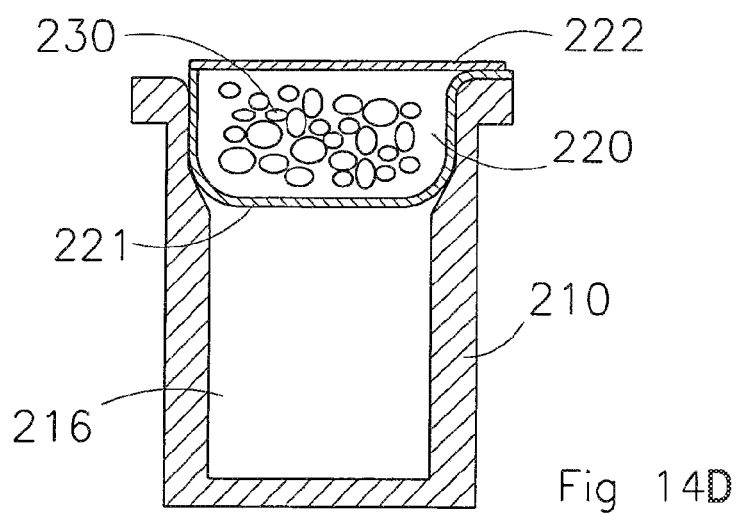

FIG. 14D shows the next step in the manufacturing method, which is the sealing of the first capsule part 221. A seal 222 is applied to the first capsule part 221 such that a closed capsule 220 is formed.

In an alternative method of fabrication, which is not shown in the figures, the capsule 220 is first filled with the functional compound 230 and then closed. After the filling and closing, the capsule 220 is arranged in the sample container 210. The capsule 220 can then be attached to the sample container 210, for example by glueing or welding. In this alternative method, the capsule 220 can be of the same type as the capsule 220 shown in FIG. 14, or of any other suitable type.

FIG. 15 shows a variant of the embodiment of FIG. 12, in cross section.

In the variant of FIG. 15, a compound container 240 is arranged inside the capsule 220. The compound container contains a functional compound 230. It is easy to arrange a functional compound 230 in the first capsule part 221 when the functional compound is in a compound container 240, which is prefilled with a predetermined amount of functional compound 230.

Figure 15A:
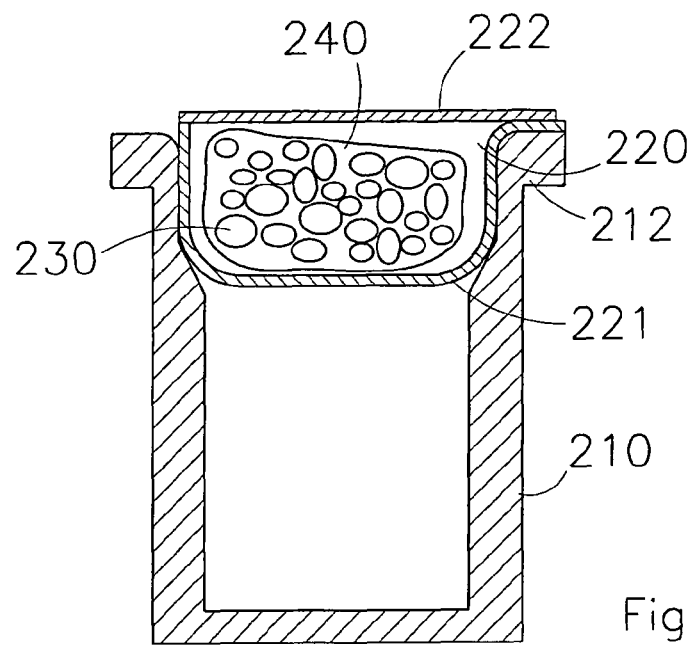
FIG. 15 a variant of the embodiment of FIG. 12, in cross section.

FIG. 15A shows the compound container being arranged in the capsule 220.

Figure 15B:
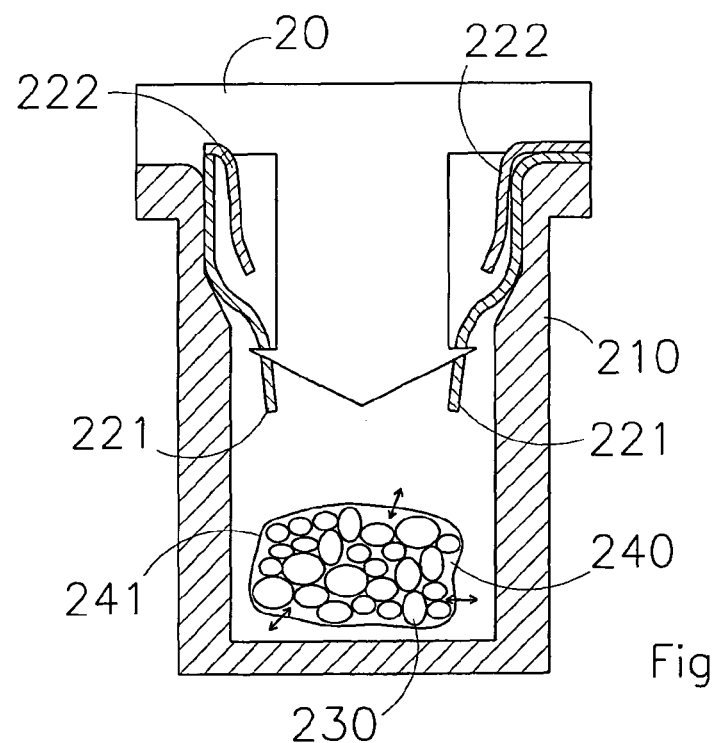

FIG. 15B shows an example of the sample container 210 of FIG. 15 after a stopper 20 has been applied. The stopper 20 has punctured the seal 222 and the first capsule part 221, such that the compound container is released into the chamber 216 of the sample container 210.

It is possible that the stopper 20 also punctures the compound container 240 such that the functional compound 230 is released into the chamber 216. It is however also envisaged that, as is shown in FIG. 15B, the compound container 240 has a porous or permeable wall 241, through which liquid and/or gas can permeate. The functional compound works on the contents of the chamber 216 (which in use included a tissue sample of the animal to be marked) through the porous or permeable wall 241.

In particular when the compound container 240 retains the functional compound during the interaction between the functional compound and the sample (that is the case when the compound container has a porous or permeable wall), it can be advantageous to remove the compound container 240 from the sample container after a while. This way it can for example be prevented that the interaction between sample and functional compound goes too far. It can also be advantageous to remove the compound container from the sample container in the case that during later processing of the sample, a next compound or substance has to be added to the sample in the sample container. By removing the compound container 240 before this next compound or substance is added, any undesired interaction between the functional compound in the compound container 240 and the next compound or substance is prevented.

The presence of a solid body—in this exemplary case the compound container 240—in the sample container 210 can be utilised in the further processing of the sample inside the sample container 210. For example, the solid body can be utilised as a mixing element when the sample container is shaken or it can be displace towards one side of the sample container when spinning the sample container in a centrifuge, for example for releasing excess fluids from the sample container. Instead of the compound container 240, an other solid body, such as a metal or plastic body, can be used for this. It is possible that at some point in the processing of the sample, the compound container 240 or any other solid body that is present in the sample container is removed from the sample container. This may be advantageous when in the processing of the sample another compound or substance has to be added to the sample in the sample container. By removing the compound container 240 and/or other solid body from the sample container, room is made for the compound or substance to be added.

Figure 16B:
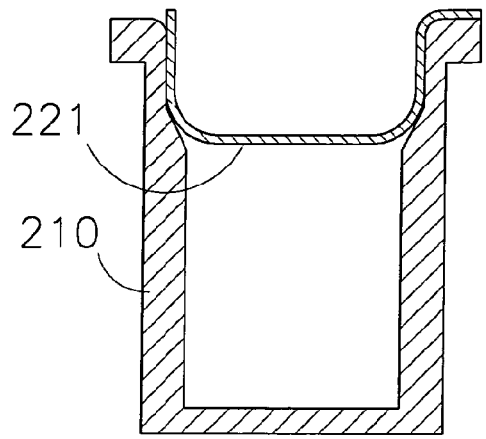
FIG. 16 the manufacturing of the sample container of FIG. 15.
Figure 16C:
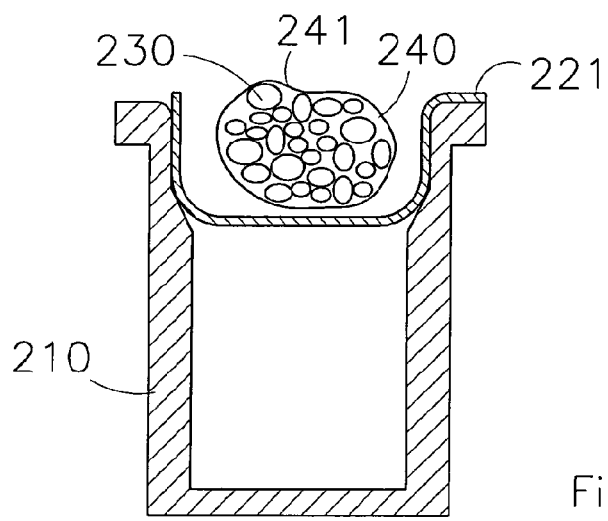
Figure 16D:
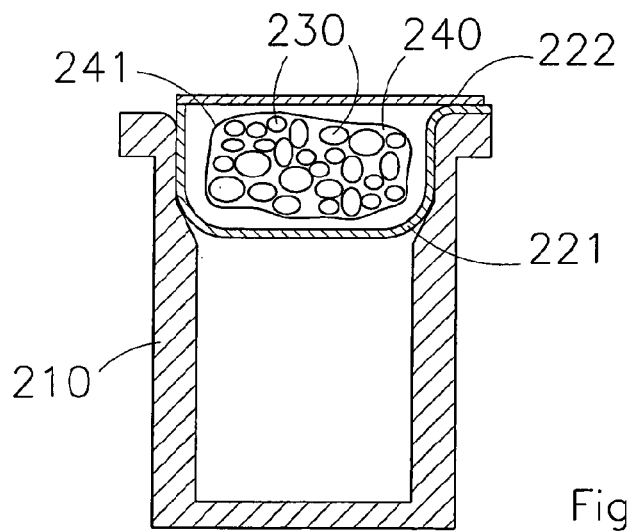

FIG. 16 shows the manufacturing of the sample container of FIG. 15. It is basically the same as the manufacturing of the sample container of FIG. 12, but now instead of that loose functional compound is arranged directly in the first capsule part 221, a compound container 240 is prefilled with functional compound and arranged in the first capsule part 221.

In an alternative method of fabrication, which is not shown in the figures, the compound container 240 is first filled with the functional compound 230 and then arranged in the capsule 220. Capsule 220 is then closed with the compound container 240 within. After the filling and closing, the capsule 220 is arranged in the sample container 210. The capsule 220 can then be attached to the sample container 210, for example by glueing or welding. In this alternative method, the capsule 220 can be of the same type as the capsule 220 shown in FIG. 14, or of any other suitable type.

Figure 17:
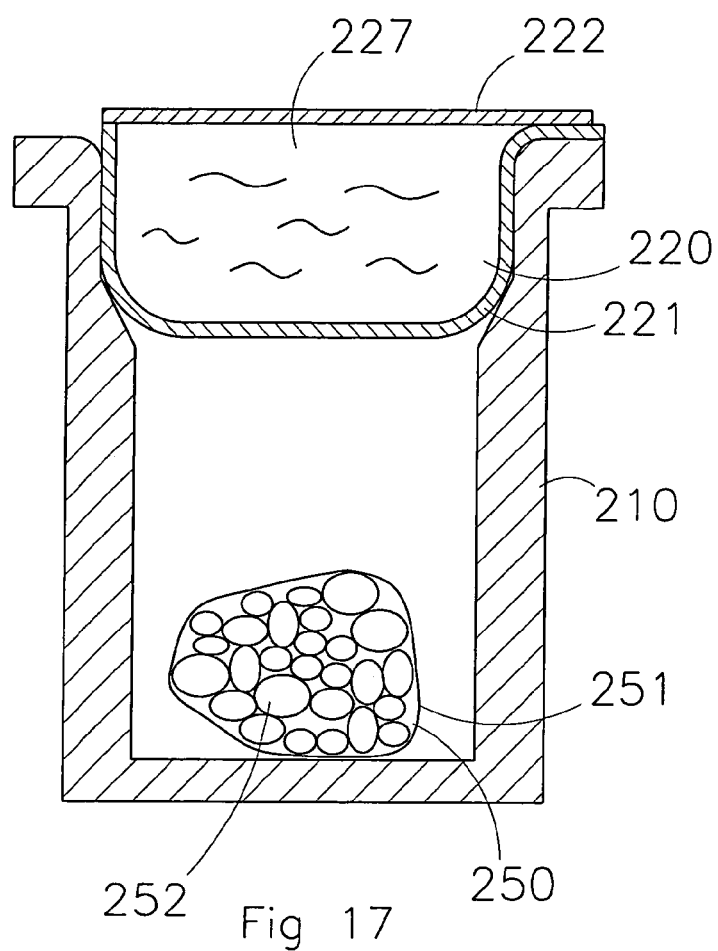
FIG. 17 another variant of the embodiment of FIG. 12, in cross section.

FIG. 17 shows another variant of the embodiment of FIG. 12, in cross section.

In this example, there a first capsule 220 and a compound container 250 are provided. The first capsule 220 is filled with a first functional compound 227, which in this example has the form of a liquid. The compound container 250 is filled with a second functional compound 252, which in this example is a powder. The compound container 251 comprises a container wall 251.

In this example, the second functional compound 252 is soluble in the first functional compound 227. When a stopper 20 has punctured both the first capsule 220 and the compound container 250, the first functional compound 227 and the second functional compound 252 get into contact with each other, so a solution of the second functional compound in the first functional compound can be obtained.

It is also possible that the compound container 252 contains a functional compound in liquid form, having a concentration that is higher than necessary or desirable for its intended use in the sample container 210. In that case, the first capsule 220 is preferably filled with a substance for diluting the functional compound of the compound container, such as water or alcohol.

When both the capsule 220 and the compound container 250 are punctured or otherwise opened, the substances come into contact with each other such that the required or desired concentration is obtained.

The invention claimed is:

1. A system for marking a non-human biological object and removing a sample of the biological object, comprising:
   a first tag part,
   a second tag part,
   a pin, having a first end and a second end, the pin being connected to the first tag part by its first end and which pin is provided with a head at its second end,
   in which the second tag part is provided with a receiving opening for the head of the pin, such that the pin can be pressed through a part of the biological object, and subsequently through the receiving opening of the second tag part, as a result of which the first and second tag parts are attached to one another and to the biological object via the pin, which system furthermore comprises:
   a sample container with an introduction opening for introducing a sample of biological material of the object into the sample container, the sample container is attached to the second tag part via a releasable connection, in such a manner that the opening of the sample container and the receiving opening of the second tag part lie in line, which sample container comprises a main chamber,
   a sample removing stopper which, while attaching the tag parts on the biological object and removing the sample therefrom, is positioned on the head of the pin and is pressed through the biological object thereby removing the sample, followed by introduction of the sample and the stopper into the sample container, said stopper thereby sealing the introduction opening of the sample container,
   said stopper being provided with a protruding circular cutter at its front, which delimits a cavity which is open at the front and in which the sample will mainly be received,
   the system further including a functional compound which can be in communication with said sample when said sample has been introduced into the sample container,
   wherein the system includes an openable capsule forming at least one sealed compartment therein filled with the functional compound, said capsule being pre-arranged within said sample container or aligned with the introduction opening of the sample container before attachment of the tag parts, said capsule being adapted to open upon introduction of the stopper into the sample container, thereby bringing said functional compound in communication with the cavity of the stopper and with the sample arranged in said cavity and brought into said sample container by the stopper,
   wherein the capsule is pre-arranged at the introduction opening of the sample container so as to close off said opening and wherein the capsule also extends into the receiving opening of the second tag part, and
   wherein the capsule comprises a peripheral wall, which peripheral wall at least comprises a section that sealingly fits into the sample container to obtain the sealing of the main chamber thereof from the exterior.

2. The system according to claim 1, wherein the openable capsule comprises a frangible wall, which is fractured upon introduction of the stopper into the sample container.

3. The system according to claim 1, wherein the openable capsule comprises a housing clampingly fitting into said sample container.

4. The system according to claim 1, wherein the sample container has space between a capsule abutment and the openable capsule pre-arranged at the introduction opening, said openable capsule being slideable towards said capsule abutment upon introduction of the stopper into the sample container so as to contact said capsule abutment, said capsule then opening upon further introduction of said stopper into said sample container.

5. The system according to claim 4, wherein the capsule abutment is a bottom of the sample container.

6. The system according to claim 1, wherein said capsule is a spherical capsule having a frangible wall.

7. The system according to claim 1, wherein said sample container includes one or more piercing members arranged to pierce said capsule upon introduction of the stopper into the sample container.

8. The system according to claim 7, wherein said sample container has a bottom opposite said introduction opening, said one or more piercing members being provided on said bottom directed towards said introduction opening.

9. The system according to claim 1, wherein the sample container has been injection moulded and a functional compound filled capsule has been integrally moulded as an insert in said sample container.

10. The system according to claim 1, wherein said capsule and said sample container are adapted such that upon pressing said capsule deeper into the sample container, a peripheral wall of said capsule is fractured.

11. The system according to claim 1,
wherein the capsule is connected to the sample container.

12. The system according to claim 11,
wherein the capsule is connected to the sample container near the opening of the sample container.

13. The system according to claim 11,
wherein the capsule is connected to the sample container at at least two separate locations.

14. The system according to claim 1,
wherein at least two capsules are arranged in the sample container.

15. The system according to claim 1,
wherein the capsule has at least two compartments.

16. The system according to claim 1,
wherein the biological object is an animal.

17. The system according to claim 1,
wherein the part of the biological object through which the pin that is connected to the first tag part is pressed is the ear of an animal.

18. A system for marking a non-human biological object and removing a sample of the biological object, comprising:
a first tag part,
a second tag part,
a pin, having a first end and a second end, the pin connected to the first tag part by its first end and which pin is provided with a head at its second end,
in which the second tag part is provided with a receiving opening for the head of the pin, such that the pin can be pressed through a part of the biological object, and subsequently through the receiving opening of the second tag part, as a result of which the first and second tag parts are attached to one another and to the biological object via the pin,
which system furthermore comprises:
a sample container with an introduction opening for introducing a sample of biological material of the object into the sample container, the sample container being attached to the second tag part via a releasable connection, in such a manner that the opening of the sample container and the receiving opening of the second tag part lie in line, which sample container comprises a main chamber
a sample removing stopper which, while attaching the tag parts on the biological object and removing the sample therefrom, is positioned on the head of the pin and is pressed through the biological object thereby removing the sample, followed by introduction of the sample and the stopper into the sample container, said stopper thereby sealing the introduction opening of the sample container,
said stopper being provided with a protruding circular cutter at its front, which delimits a cavity which is open at the front and in which the sample will mainly be received,
the system further including a functional compound which can be in communication with said sample when said sample has been introduced into the sample container,
wherein the system includes an openable capsule forming at least one sealed compartment therein filled with the functional compound, said capsule being pre-arranged within said sample container or aligned with the introduction opening of the sample container before attachment of the tag parts, said capsule being adapted to open upon introduction of the stopper into the sample container, thereby bringing said functional compound in communication with the cavity of the stopper and with the sample arranged in said cavity and brought into said sample container by the stopper,
wherein said capsule has a top wall, bottom wall and peripheral wall and wherein said capsule is pre-arranged at the introduction opening of the sample container so as to close off said opening and wherein the peripheral wall at least comprises a section that sealing fits into the sample container to obtain the sealing of the main chamber thereof from the exterior,
wherein the sample container has space between a capsule abutment and the openable capsule pre-arranged at the introduction opening, and
wherein the openable capsule is adapted to be slidable within the container towards said capsule abutment upon introduction of the stopper into the sample container so as to contact said capsule abutment, said capsule then opening upon further introduction of said stopper into said sample container.

19. A system for marking a non-human biological object and removing a sample of the biological object, comprising:
a first tag part,
a second tag part,
a pin, having a first end and a second end, the pin connected to the first tag part by its first end and which pin is provided with a head at its second end,
in which the second tag part is provided with a receiving opening for the head of the pin, such that the pin can be pressed through a part of the biological object, and subsequently through the receiving opening of the second tag part, as a result of which the first and second tag parts are attached to one another and to the biological object via the pin,
which system furthermore comprises:
a sample container with an introduction opening for introducing a sample of biological material of the object into the sample container, the sample container being attached to the second tag part via a releasable connection, in such a manner that the opening of the sample container and the receiving opening of the second tag part lie in line, which sample container comprises a main chamber,
a sample removing stopper which, while attaching the tag parts on the biological object and removing the sample therefrom, is positioned on the head of the pin and is pressed through the biological object thereby removing the sample, followed by introduction of the sample and the stopper into the sample container, said stopper thereby sealing the introduction opening of the sample container,
said stopper being provided with a protruding circular cutter at its front, which delimits a cavity which is open at the front and in which the sample will mainly be received,
the system further including a functional compound which can be in communication with said sample when said sample has been introduced into the sample container,
wherein the system includes an openable capsule forming at least one sealed compartment therein filled with the functional compound, said capsule being pre-arranged within said sample container or aligned with the introduction opening of the sample container before attachment of the tag parts, said capsule being adapted to open upon introduction of the stopper into the sample container, thereby bringing said functional compound in communication with the cavity of the stopper and with the sample arranged in said cavity and brought into said sample container by the stopper, wherein the capsule has a top wall, which top wall is a frangible wall, which top wall includes one or more ribs on the side facing the stopper, and wherein the top wall of the capsule comprises ribs in the form of a cross, delimiting grooves there between.

\* \* \* \* \*